(12) United States Patent
Chan et al.

(10) Patent No.: US 8,452,888 B2
(45) Date of Patent: May 28, 2013

(54) FLOW CONTROL FOR RELIABLE MESSAGE PASSING

(75) Inventors: Uman Chan, Wappingers Falls, NY (US); Deryck X Hong, Jackson Heights, NY (US); Tsai-Yang Jea, Poughkeepsie, NY (US); Chulho Kim, Poughkeepsie, NY (US); Zenon J Piatek, Poughkeepsie, NY (US); Hung Q Thai, Poughkeepsie, NY (US); Abhinav Vishnu, Kennewick, WA (US); Hanhong Xue, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 12/841,399

(22) Filed: Jul. 22, 2010

(65) Prior Publication Data

US 2012/0023304 A1    Jan. 26, 2012

(51) Int. Cl.
 *G06F 9/46* (2006.01)
 *G06F 12/02* (2006.01)

(52) U.S. Cl.
 USPC ............................ 709/232; 709/224; 370/235

(58) Field of Classification Search
 USPC .......... 709/232–235, 223–224, 228; 370/229, 370/235–240
 See application file for complete search history.

(56) References Cited

U.S. PATENT DOCUMENTS

| | | | |
|---|---|---|---|
| 7,190,667 B2 | 3/2007 | Susnow et al. | |
| 7,324,525 B2 | 1/2008 | Fuhs et al. | |
| 7,454,491 B2 | 11/2008 | Blackmore et al. | |
| 7,536,468 B2 | 5/2009 | Blackmore et al. | |
| 7,853,774 B1 * | 12/2010 | Wentzlaff | 712/10 |
| 2003/0023775 A1 | 1/2003 | Blackmore et al. | |
| 2003/0225874 A1 | 12/2003 | Blackmore et al. | |
| 2004/0111652 A1 * | 6/2004 | Shoaib et al. | 714/15 |
| 2004/0202319 A1 * | 10/2004 | Hussain et al. | 380/33 |
| 2006/0133278 A1 * | 6/2006 | Hill et al. | 370/235 |

(Continued)

FOREIGN PATENT DOCUMENTS

EP    0826280 B1    10/2003

OTHER PUBLICATIONS

Barrett, Brian W., "One-Sided Communication for High Performance Computing Applications," Department of Computer Science, Indiana University, Mar. 2009.

(Continued)

*Primary Examiner* — Ruolei Zong
(74) *Attorney, Agent, or Firm* — Matthew W. Baca; Amy J. Pattillo

(57) ABSTRACT

A message flow controller limits a process from passing a new message in a reliable message passing layer from a source node to at least one destination node while a total number of in-flight messages for the process meets a first level limit. The message flow controller limits the new message from passing from the source node to a particular destination node from among a plurality of destination nodes while a total number of in-flight messages to the particular destination node meets a second level limit. Responsive to the total number of in-flight messages to the particular destination node not meeting the second level limit, the message flow controller only sends a new packet from among at least one packet for the new message to the particular destination node while a total number of in-flight packets for the new message is less than a third level limit.

17 Claims, 8 Drawing Sheets

U.S. PATENT DOCUMENTS

| | | | |
|---|---|---|---|
| 2007/0223379 A1* | 9/2007 | Sivakumar et al. | 370/235 |
| 2008/0127203 A1 | 5/2008 | Huang et al. | |
| 2009/0007140 A1 | 1/2009 | Jia | |
| 2009/0198762 A1 | 8/2009 | Arimilli et al. | |

OTHER PUBLICATIONS

"Sliding Window Protocol", Wikipedia, Accessed Online at HTTP://EN.WIKIPEDIA.ORG/WIKI/SLIDING_WINDOW, 7 Pages, Accessed on Feb. 23, 2010.

Koop, Matthew J., "High-Performance Multi-Transport MPI Design for Ultra-Scale Infiniband Clusters", Dissertation, Graduate School of The Ohio State University, 2009.

Carpenter, Bryan, "LAPI Implementation", Accessed Online at http://www.hpjava.org/theses/slim/dissertation/node54.html, 2 pages, available at least by Aug. 6, 2009.

LAPI Programming Guide, IBM Reliable Scalable Cluster Technology for AIX 5L, copyright IBM Corporation, Sep. 2004, 296 pages.

Bhoedjang, Raoul, et al, "Efficient Multicast on Myrinet Using Link-Level Flow Control", The Netherlands, 1998, accessible online at http://citeseerx.ist.psu.edu/viewdoc/summary?doi=10.1.1.51.365, 10 pages.

Heirich, Alan, et al, "Server-Net II: a Reliable Interconnect for Scalable High Performance Cluster Computing", Compaq Computer Corporation, Sep. 21, 1998, 24 pages.

Bhoedjang, Raoul, "Communication Architectures for Parallel-Programming Systems," copyright 2000, Advanced School for Computing and Imaging Dissertation Series No. 52, 282 pages.

Verstoep, Kees, "Cluster Communication Protocols for Parallel-Programming Systems", ACL Transactions on Computer Systems, vol. 22, No. 3, Aug. 2004, pp. 281-325, 45 pages.

* cited by examiner

| FLOW CONTROL LEVEL | SENDING LIMITS | RECEIVING THRESHOLDS | CONTROL MECHANISMS |
|---|---|---|---|
| LEVEL 1 502 | TOTAL NUMBER OF IN-FLIGHT MESSAGES BY PROCESS | AUTOMATIC | IMMEDIATE ACK FLAG |
| LEVEL 2 504 | THE NUMBER OF IN-FLIGHT MESSAGES TO EACH DESTINATION | MIN COALESCING/ PER DESTINATION LIMIT | MESSAGE IDS WITH MESSAGE LEVEL ACKNOWLEDGEMENTS |
| LEVEL 3 506 | THE NUMBER OF IN-FLIGHT PACKETS BY MESSAGE | PER MESSAGE LIMIT TRIGGERED | SLIDING WINDOW OR PACKET IDS |

FIG. 5

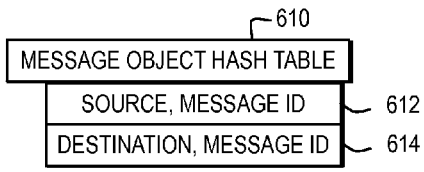

FIG. 6

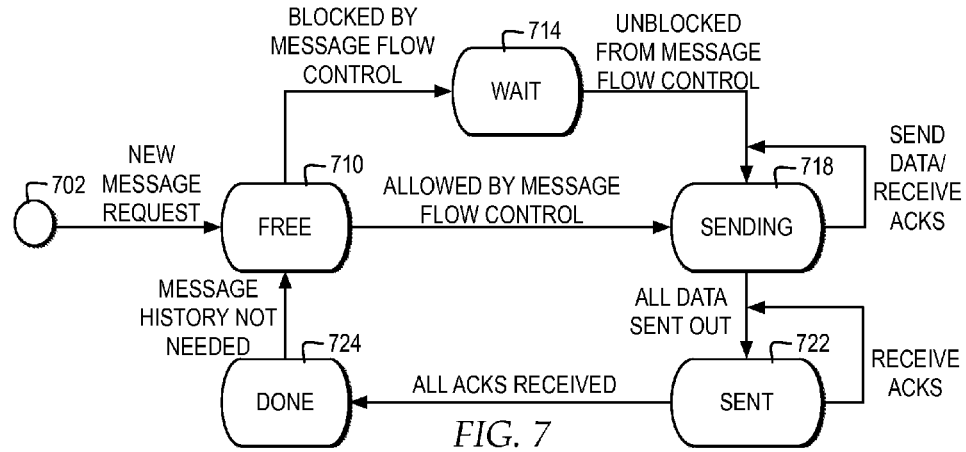

FIG. 7

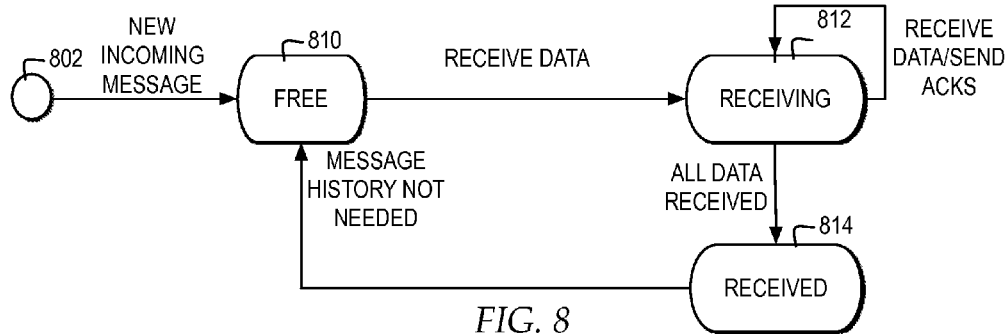

FIG. 8

FLOW CONTROL FOR RELIABLE MESSAGE PASSING

This invention was made with United States Government support under HR0011-07-9-0002 awarded by DARPA. The Government has certain rights in the invention.

BACKGROUND

1. Technical Field

This invention relates in general to communication protocols for computing environments, and more particularly, to flow control for message passing in a reliable message passing layer.

2. Description of the Related Art

The Internet and other networks typically implement protocol layers stacked on top of each other with each protocol layer offering differing functionalities and performance. In one example, protocol layering may be used to protect software layers, which use the protocol layers for reliable communication, from the physical hardware details that control the actual sending of data over the network.

As computer systems become more complex, additional protocol layers may be added for support. For example, protocol layering in high-performance parallel computing systems may include message layer protocols for enhancing message-based communications over a network. Low-level application program interface (LAPI) is an example of a messaging layer protocol that is a message-passing API providing an active message, one-sided communication model.

By implementing LAPI and other reliable communication layers, the reliable communication layer provides for reliable message passing, whether across a reliable or unreliable interconnect or others layers. LAPI and other reliable communication layers may include a sending or source node and a receiving or destination node, where the source node requires the destination node to return an acknowledgment of receipt of each packet of a message. The source node tracks whether acknowledgments are received and if the destination node does not return an acknowledgment within a period of time, the source node may resend the packet. When packets are only traveling to a few destinations, memory requirements for tracking acknowledgment of packets by destination are typically manageable. In the current network environment, however, the memory and resource management for tracking acknowledgment of packets by destination for a few destinations does not scale well when the number of destinations scales up, such as to a million destinations.

BRIEF SUMMARY

In view of server systems implementing a messaging protocol layer for reliable message passing, as the number of destinations passed to by a source increases, there is a need for managing flow control for in-flight messages and packets at multiple levels, rather than only per destination, to optimize memory resource usage.

In one embodiment, a method, system, and program are provided for flow control of message passing in a reliable message passing layer. Responsive to receiving a request to pass a new message in a reliable message passing layer from a process, a message flow controller limits the process from passing the new message from a source node to at least one destination node while a total number of in-flight messages for the process meets a first level limit. Responsive to the total number of in-flight messages for the process not meeting the first level limit, the message flow controller limits the new message from passing from the source node to a particular destination node from among a plurality of destination nodes while a total number of in-flight messages to the particular destination node meets a second level limit. Responsive to the total number of in-flight messages to the particular destination node not meeting the second level limit, only sending a new packet from among at least one packet for the new message from the source node to the particular destination node while a total number of in-flight packets for the new message is less than a third level limit. Responsive to sending the at least one packet from the source node to the particular destination node, tracking by the message flow controller at the source node whether an acknowledgment is received from the destination node of complete receipt of the new message.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 5 is a block diagram depicting one example of the flow control levels and associated sending limits, receiving thresholds, and control mechanisms;

FIG. 6 is a block diagram illustrating one example of a look-up table for message objects;

FIG. 7 is a flow diagram depicting one example of the states tracked for a message object when sending a message;

FIG. 8 is a flow diagram illustrating one example of the states tracked for a message object when receiving a message;

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art that the present invention may execute in a variety of systems, including a variety of computer systems and electronic devices operating any number of different types of operating systems.

Figure 1:
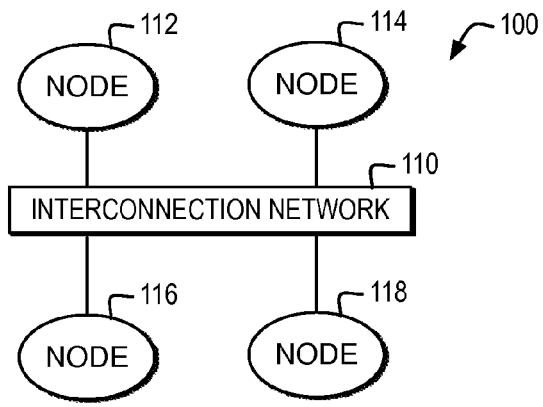
FIG. 1 is a block diagram depicting one example of a high performance computing system implementing an interconnection network with a reliable message passing layer.

With reference now to the Figures, and in particular with reference to FIG. 1, a block diagram illustrates one example of a high performance computing system implementing an interconnection network with a reliable message passing layer. In the example, a high performance computing environment 100 includes an interconnection network 110 for connecting multiple nodes, illustrated as nodes 112, 114, 116, and 118.

Each of nodes 112, 114, 116, and 118 may include multiple types of computing nodes including, but not limited to, one or more of a processing node, an input/output (I/O) node, a singe processor system, a multiple processor system, a cluster system of multiple computing nodes, a grid environment, and other systems including a network interface for connecting to interconnection network 110. Those of ordinary skill in the art will appreciate that while FIG. 1 illustrates nodes 112, 114, 116, and 118, high performance computing environment 100 may include any number of nodes implemented in one or more network protocol architectures.

In the example depicted, each of nodes 112, 114, 116, and 118 may include one or more adapters as part of the network interface for connecting to interconnection network 110. It will be understood that multiple types of adapters may be implemented by each of nodes 112, 114, 116, and 118, where each adapter may communicate with another adapter, a switch, or other component within interconnection network 110.

Interconnection network 110 may include one or more types of network elements, switching elements, nodes, clusters, adapters, and other elements for communicatively connecting with nodes 112, 114, 116, and 118. In addition, interconnection network 110 may implement one or more types of underlying network architectures and services. For example, interconnection network 110 may include, but is not limited to, the Internet, a wide area networks (WANs), a local area networks (LANs), an Ethernet, a token ring, and a network service providers. Further, interconnection network 110 may transport data between nodes using one or more types of communication protocols. In one example, interconnection network 110 implements protocols for transferring data within a packet-switching network, such as using the transmission control protocol/internet protocol (TCP/IP), however, interconnection network 110 may include multiple gateways, routers, and other hardware, software and other elements to enable integration of networks using additional or alternate protocols and additional or alternate layers of protocols. The hardware and software implemented by interconnection network 110 may provide one or more of reliable and unreliable passing of messages.

In one example, interconnection network 110 may implement one or more switches connected in one or more network topologies. For example, interconnection network 110 may implement a hierarchy of switches for connecting nodes where multiple nodes share links between switches. In one example, the switches implemented within interconnection network 110 may include InfiniBand switches (InfiniBand is a registered trademark of InfiniBand Trade Association) implemented within an InfiniBand architecture. In one example, an InfiniBand architecture may represent a channel-based architecture, which may include capabilities such as zero-copy data transfers using remote direct memory access (RDMA) and congestion-management. In addition, an InfiniBand architecture may implement a multi-layer architecture to transfer data from one node to another node. Each of nodes 112, 114, 116, and 118 may include software layers, drivers, and other components for sending and receiving data packets within the Infiniband architecture and in particular, for optimizing use of all available bandwidth within interconnection network 110.

Although not depicted, interconnection network 110 may implement high-speed, bi-directional interconnects between devices and between each of nodes 112, 114, 116, and 118. Each bi-directional link may contain one or more dedicated send and receive channels. One skilled in the art will appreciate that additional or alternate types of link hardware may be implemented within parallel computing environment 100.

Each nodes 112, 114, 116, and 118 may act as a source node, sending packets to one or more other nodes via interconnection network 110, and each of nodes 112, 114, 116, and 118 may act as a destination node, receiving packets from one or more other nodes via interconnection network 110. Each of nodes 112, 114, 116, and 118 may implement one or more reliable message passing layers that track in-flight packets between nodes, to detect and retransmit any lost packets. To optimize the available memory available to the reliable message passing layer from nodes 112, 114, 116, and 118, the reliable message passing layer implements multiple levels of flow control on the number of in-flight messages allowed by a process at any one time, the number of in-flight messages allowed per each destination at any one time, and the number of in-flight packets allowed for a message at any one time. By implementing multiple levels of flow control, as the number of destination nodes for a message exponentially scales up, use of available memory is optimized for timely tracking of in-flight packets and sending of acknowledgements to avoid unnecessary retransmissions. By implementing reliability within a message passing layer, other layers, such as one or more layers of interconnection network 110, may perform as unreliable layers to avoid unnecessary consumption of resources for packet tracking as the number of nodes accessible via interconnection network 110 scales up.

One skilled in the art will appreciate that the number and configuration of nodes, switches and links shown in FIG. 1 is provided as an example high performance computing environment. Numerous implementations and arrangements of a number of nodes, switches, and links in all types of data and computing networks may be implemented.

Figure 2:
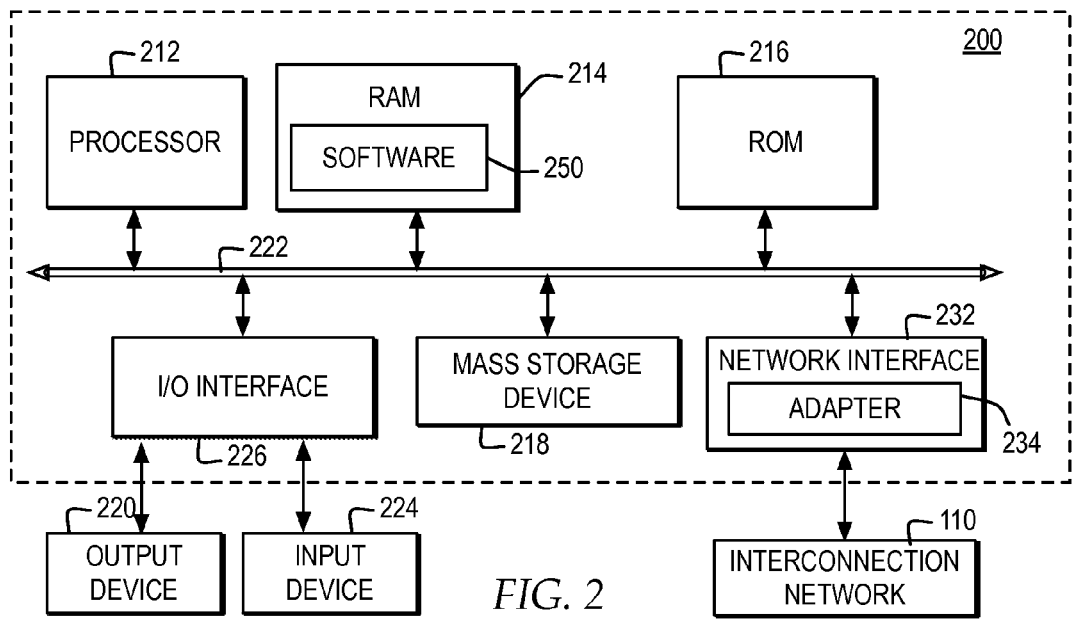
FIG. 2 is a block diagram illustrating one example of a computer system in which the present invention may be implemented.

Referring now to FIG. 2, a block diagram illustrates one example of a computer system in which the present invention may be implemented. The present invention may be performed in a variety of systems and combinations of systems, made up of functional components, such as the functional components described with reference to computer system 200 and may be communicatively connected to a network, such interconnection network 110. As described herein, one or more functional components of computer system 200 may represent a node, such as one of nodes 112, 114, 116, and 118, or a grouping of multiple instances of one or more functional components of computer system 200 may represent a node, such as one of nodes 112, 114, 116, and 118.

Computer system 200 includes a bus 222 or other communication device for communicating information within computer system 200, and at least one hardware processing device, such as processor 212, coupled to bus 222 for processing information. Bus 222 preferably includes low-latency and higher latency paths that are connected by bridges and adapters and controlled within computer system 200 by multiple bus controllers. When implemented as a server or node, computer system 200 may include multiple processors designed to improve network servicing power. Where multiple processors share bus 222, additional controllers (not depicted) for managing bus access and locks may be implemented.

Processor 212 may be at least one general-purpose processor such as IBM's PowerPC (PowerPC is a registered trademark of International Business Machines Corporation) processor that, during normal operation, processes data under the control of software 250, which may include at least one of application software, an operating system, middleware, and other code and computer executable programs accessible from a dynamic storage device such as random access memory (RAM) 214, a static storage device such as Read Only Memory (ROM) 216, a data storage device, such as mass storage device 218, or other data storage medium. Software 250 may include, but is not limited to, applications, protocols, interfaces, and processes for controlling one or more systems within a network including, but not limited to, an adapter, a switch, a cluster system, and a grid environment.

In one embodiment, the operations performed by processor 212 may control the operations of flowchart of FIGS. 10-13 and other operations described herein. Operations performed by processor 312 may be requested by software 250 or other code or the steps of the present invention might be performed by specific hardware components that contain hardwired logic for performing the steps, or by any combination of programmed computer components and custom hardware components.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, microcode, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 218, a random access memory (RAM), such as RAM 214, a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, such as computer system 200, partly on the user's computer, as a stand-alone software package, partly on the user's computer and partly on a remote computer or entirely on the remote computer or server. In the latter scenario, the remote computer may be connected to the user's computer through any type of network, such as interconnection network 110, through a communication interface, such as network interface 232, over a network link that may be connected, for example, to interconnection network 110.

In the example, network interface 232 includes an adapter 234 for connecting computer system 200 to interconnection network 110 through a link. Although not depicted, network interface 232 may include additional software, such as device drivers, additional hardware and other controllers that enable communication. When implemented as a server, computer system 200 may include multiple communication interfaces accessible via multiple peripheral component interconnect (PCI) bus bridges connected to an input/output controller, for example. In this manner, computer system 200 allows connections to multiple clients via multiple separate ports and each port may also support multiple connections to multiple clients.

The present invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 200, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 200, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 232, the network link to interconnection network 110, and interconnection network 110 may use electrical, electromagnetic, or optical signals that carry digital data streams. The signals through the various networks and the signals on interconnection network 110, the network link to interconnection network 110, and network interface 232 which carry the digital data to and from computer system 200, may be forms of carrier waves transporting the information.

In addition, computer system 200 may include multiple peripheral components that facilitate input and output. These peripheral components are connected to multiple controllers, adapters, and expansion slots, such as input/output (I/O) interface 226, coupled to one of the multiple levels of bus 222. For example, input device 224 may include, for example, a microphone, a video capture device, an image scanning system, a keyboard, a mouse, or other input peripheral device, communicatively enabled on bus 222 via I/O interface 226 controlling inputs. In addition, for example, a display device 220 communicatively enabled on bus 222 via I/O interface 226 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 2 may vary. Furthermore, those of ordinary skill in the art will appreciate that the depicted example is not meant to imply architectural limitations with respect to the present invention.

Figure 3:
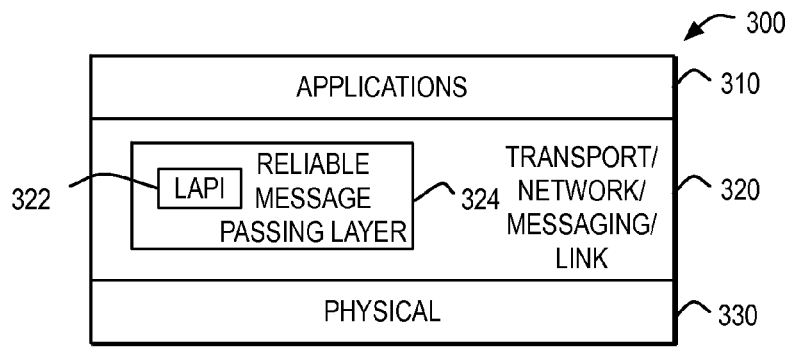
FIG. 3 is a block diagram depicting one example of a protocol stack within a high performance computing environment implementing at least one reliable message passing layer.

With reference now to FIG. 3, a block diagram illustrates one example of a protocol stack within a high performance computing environment implementing at least one reliable message passing layer. As illustrated, protocol layers 300 include an application layer 310, a transport/network/messaging/link layer 320, and a physical layer 330. One of ordinary skill in the art will appreciate that protocol layers 300 may include additional or alternate layers and that each application layer 310, transport/network/messaging/link layer 320, and physical layer 330 may include additional or alternate components and layers and protocol components may overlap one or more of the layers illustrated.

In the example depicted, transport/network/messaging/link layer 320 may include multiple layers and multiple components within each layer. In addition, in the example depicted, transport/network/messaging/link layer 320 may include at least one reliable message passing layer 324. Reliable message passing layer 324 implements reliable message passing that tracks in-flight packets between nodes, to detect and retransmit any lost packets. Reliable message passing layer 324 implements multiple levels of flow control on the number of in-flight messages allowed by a process at any one time, the number of in-flight messages allowed per each destination at any one time, and the number of in-flight packets allowed for a message at any one time. By implementing multiple levels of flow control, as the number of destination nodes for a message exponentially scales up, use of available memory is optimized for timely tracking of in-flight packets and sending of acknowledgements to avoid unnecessary retransmissions.

In particular, in the example depicted, one example of a reliable message passing layer is low-level application program interface (LAPI) 322. LAPI 322 is a one-sided communication protocol that does not require both the sending node of a computing environment and the receiving node to each take an action before a data message transfer between the nodes can be completed. LAPI provides communication reliability by requiring retransmission of packets of a message that are not acknowledged by the receiving node or retransmission of packets for which the receiving node requests retransmission. LAPI 322 includes a LAPI library that provides basic operations to "put" data and to "get" data from one or more virtual addresses of a remote task. In addition, LAPI 322 provides an active message infrastructure that enables programs to install a set of handlers that are called and run in the address space of a target task on behalf of the task originating the active message. One of ordinary skill in the art will appreciate that although FIG. 3 illustrates LAPI 322 as the example of a one-sided protocol layer for reliable message passing within reliable message layer 324, other one-sided or active messaging protocol layers may be implemented within reliable message layer 324 within one or more layers of transport/network/messaging/link layer 320. In addition, one of ordinary skill in the art will appreciate that LAPI 322 may receive messages directly from applications layer 310 or from a layer within transport/network/messaging/link layer 320, such as a message passing interface (MPI) layer.

Transport/network/messaging/link layer 320 may be implemented within one or more adapters, such as adapter 234, and may include one or more additional protocols between LAPI 322 and physical layer 330. Physical layer 330 may include, for example, the port and other hardware for interfacing with interconnection network 110 or additional communication network layers. In one example, while reliable message layer 324 provides for reliable message passing by requiring retransmission of packets of a message that are not acknowledged by the receiving node or retransmission of packets for which the receiving node requests retransmission, other protocols within transport/network/messaging/link layer 320 and physical layer 330 that reliable message layer 324 passes messages over may be unreliable.

Figure 4:
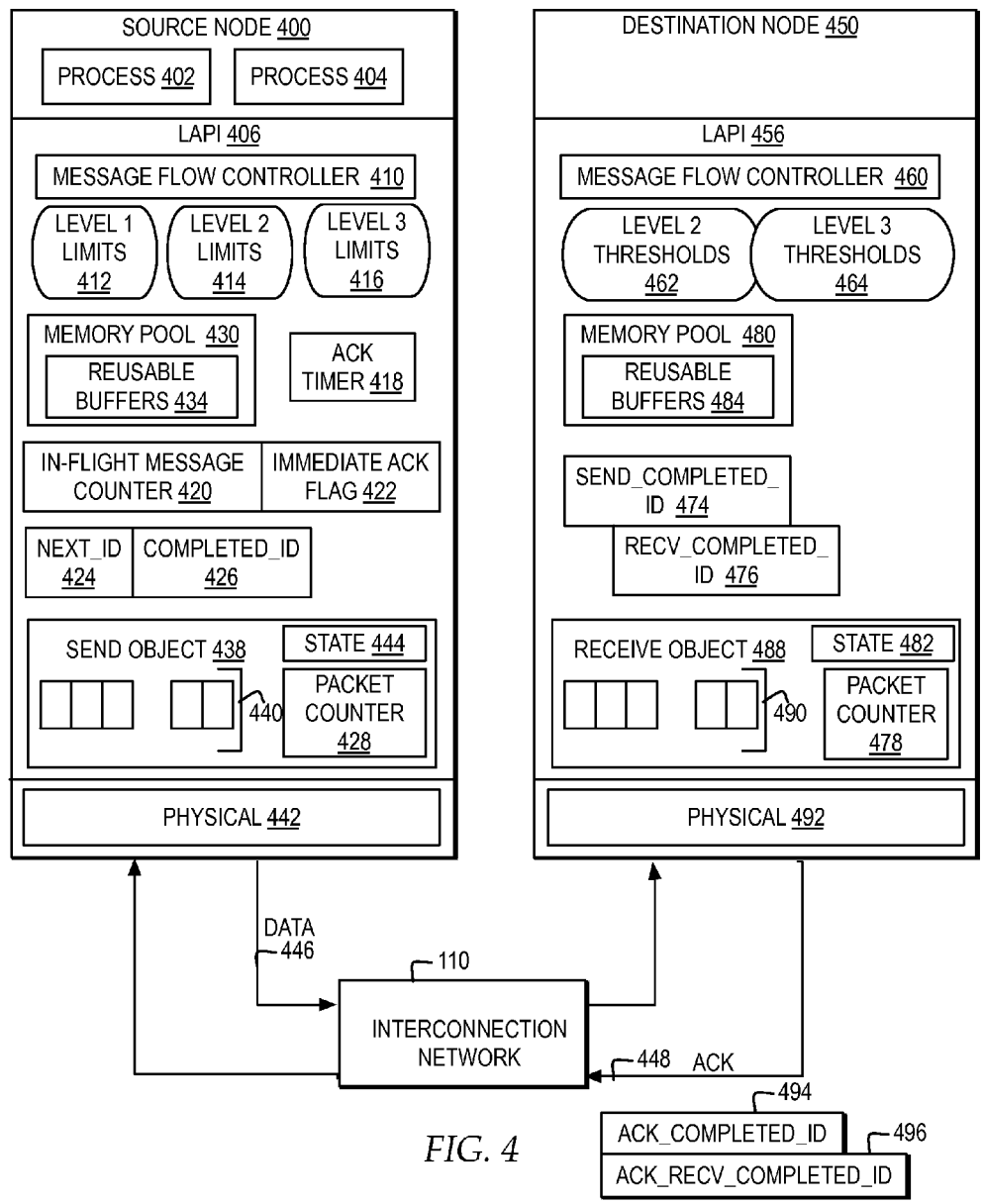
FIG. 4 is a block diagram illustrating one example of flow control for efficiently scalable reliable message passing over an unreliable interconnection network.

With reference now to FIG. 4, a block diagram illustrates one example of flow control for efficiently scalable reliable message passing over an unreliable interconnection network. In the example, for purposes of example, a source node 400 includes multiple processes, illustrated as processes 402 and 404, LAPI 406, and a physical layer 442 and a destination node 450 includes LAPI 456 and a physical layer 492. Source node 400 transfers packets of data 446 to destination node 450 via interconnection network 110 and destination node 450 returns acknowledgment packets (ACK) 448 to source node 400 via interconnection network 110. Source node 400 may also send acknowledgement packets to destination node 450. One of ordinary skill in the art will appreciate that a single node may incorporate the components illustrated in both source node 400 and destination node 450 and that a single node may perform the functions of both source node 400 and destination node 450.

In one example, each of processes 402 and 404 may trigger multiple jobs, with each job triggering multiple tasks for passing messages in a message passing layer implemented by LAPI 406 and LAPI 456. In the example, LAPI 406 includes a message flow controller 410 and LAPI 456 includes a message flow controller 460 for flow control for reliable message passing. To implement efficiently scalable, reliable message passing, message flow controller 410 and message flow controller 460 control the flow of messages, in packet form, by minimizing the size of the data structure required for monitoring the flow of messages and acknowledgment of received messages within multiple levels of flow control. Although not depicted, for a particular process, each of message flow controller 410 and message flow controller 460 may be implemented by calling one or more LAPI handlers to handle the processing of each process task and LAPI may implement one or more additional counters for counting the number of messages, jobs, tasks, and other values.

In the example, to minimize the size of the data structure required by LAPI 406 and LAPI 456 for efficiently scalable, reliable control of the flow of messages, LAPI 406 and LAPI 456 allocate a message object on-demand for each message and free the message object on the fly for each message when fully acknowledged. In the example, the message object allocated for a sent message is illustrated as send object 438 and the message object allocated for a received message is illustrated as receive object 488. Rather than pre-allocating a fixed number of message buffers and packet buffers for each destination to enable reliable communication, send object 438 and receive object 488 are allocated on-demand per message and freed on the fly per message completion, reducing the use of memory resources when there are large number of tasks in a job. Each message object, illustrated as send object 438 and receive object 488, is used to track the state of the message, to support packet level flow control, and to achieve reliable communication. In particular, each of send object 438 and receive object 488 further include state bits 444 and 482 for tracking a state of each memory object, and packet flow control windows 440 and 490, which track the flow of packets per message.

To minimize resource allocation overhead for on-demand allocation and freeing of memory buffers when creating memory objects, LAPI 406 and LAPI 456 each implement a memory pool of reusable, pre-allocated buffers, illustrated as memory pool 430 and memory pool 480, respectively, with reusable buffers 434 and reusable buffers 484. At initialization, each of LAPI 406 and LAPI 456 may allocate a minimum number of pre-allocated buffers within reusable buffers 434 and reusable buffers 484. In addition, in the absence of any free buffers within reusable buffers 434 or reusable buffers 484, LAPI 406 or LAPI 456 may allocate a new buffer within reusable buffers 434 or reusable buffers 484. LAPI 406 and LAPI 456 release memory buffers from reusable buffers 434 and reusable buffers 484 to allocate memory objects on-demand. Once a buffer is freed, the buffer can be reused and is returned to reusable buffers 434 or reusable buffers 484. For well behaved applications, a steady state may be reached after a number of allocations to reusable buffers, such that all requests may be serviced from memory pool 430 and memory pool 480 without allocation overhead for the allocation of additional reusable buffers within memory pool 430 and memory pool 480.

To maximize the use of memory pool 430 and memory pool 480 while also tracking whether acknowledgments are received for each packet in-flight in a timely manner to avoid unnecessary retransmissions of packets, message flow controller 410 controls the amount of in-flight traffic tracked between source node 400 and one or more destination nodes. To control the actual flow of messages within efficiently scalable, reliable message passing layers, message flow controller 410 and message flow controller 460 apply multiple levels of flow control. As described herein, three levels of flow control are implemented and each level includes at least one limit. For example, as illustrated, the three levels of flow control are referred to by "level 1", "level 2", and "level 3". The limits applied by each level, for example by LAPI 406, are illustrated by level 1 limits 412, level 2 limits 414, and level 3 limits 416.

As illustrated in FIG. 5, a block diagram illustrates one example of the flow control levels and associated sending limits, receiving thresholds, and control mechanisms. Referring now to FIGS. 4 and 5, message flow controller 410 may implement handlers for applying level 1 limits 412, level 2 limits 414, and level 3 limits 416 where level 1 flow control 502 applies level 1 limits 412 to a limit on the total number of in-flight messages that tasks of each of process 402 and process 404 can produce, level 2 flow control 504 applies level 2 limits 414 to a limit on the number of in-flight messages to each destination, and level 3 flow control 506 applies level 3 limits 416 to a limit on the number of in-flight packets that a message can produce. By limiting the total number of in-flight messages that a process can produce and limiting the total number of in-flight packets that a message can produce, applying level 1 limits 412 and level 3 limits 416 effectively limits the total amount of memory allocated on-demand for memory objects at any one time at source node 400 and limits the total amount of memory required for allocating memory objects on-demand for messages received by a destination node 450.

LAPI 406 and LAPI 456 add identification to in-flight packets passed from source node 400 to destination node 450 to implement multiple level flow control. In one example, in-flight packets may be identified by a per-destination message ID and a per-message packet ID. In another example, in-flight packets may be identified by a source, destination, message ID and packet ID, such as when the in-flight packet is issued for a parallel job. Message IDs and packet IDs may be reused once delivery confirmation is received for the message or packet. The size of message IDs may be minimized to numbers modulo M, where M is the limit on the number of in-flight messages to each destination set in level 2 limits 414.

As illustrated in FIG. 6, a message object hash table 610 may be maintained within one or more of source node 400, destination node 450, and interconnection network 110 to provide a minimized data structure for maintaining a look-up table for each message object by one or more of source and message ID, as illustrated at reference numeral 612, and destination and message ID, as illustrated at reference numeral 614. Level 2 flow control 504 and level 3 flow control 506 may look up message objects by source and message ID or destination and message ID in message object hash table 610 for flow control, as will be further described. Message object hash table 610 may maintain hash values as indexes into each entry. One of ordinary skill in the art will appreciate that a hash table is one type of data structure that may be used for a look-up table for each message object, however additional or alternate types of data structures may be implemented.

In particular, message flow controller 410 implements level 1 flow control 502 by tracking the number of in-flight messages by process through an in-flight message counter 420 and limiting processes 402 and 404 to a maximum number of in-flight messages set in level 1 limits 412. To minimize any slowdown that may occur by in-flight message counter 420 reaching level 1 limits 412 and level 2 flow control 504 delaying in return of message-level completion acknowledgments, an immediate ack flag 422 may be set by level 1 flow control 502 to solicit immediate return of message completion acknowledgments from message flow controller 460 of destination node 450

Message flow controller 410 implements level 2 flow control 504 by limiting the number of in-flight messages to each destination and providing message level acknowledgments of completion. In the example, message flow controller 410 and message flow controller 460 implement level 2 flow control 504 by each maintaining two message identifiers per destination or source. In the example, the two level 2 message identifiers maintained by source node 400 per destination are illustrated as a next_ID 424 and a completed_ID 426 and the two level 2 message identifiers maintained by destination node 450 per source are illustrated as send_completed_id 474 and recv_completed_id 476.

In the example, next_ID 424 indicates the ID to be used by the next message and completed_ID 426 indicates that any message using the completed_ID or an older ID has completed. By maintaining next ID 424 and completed ID 426, for level 2 flow control 504, message flow controller 410 only needs to track messages using IDs with the values of "completed_ID+1" to "next_ID−1" for each destination. As will be further described with reference to FIG. 7, send object 438 includes a state 444 of each message being tracked indicating whether the message is waiting to be processed, being sent, sent, or done.

Using the value of "next_ID−1-completed_ID", message flow controller 410 may efficiently determine the number of in-flight messages for a destination. Upon allocating send object 438 for a particular message to be sent, if the number of in-flight messages for a destination has reached level 2 limits 414, then message flow controller may set state 444 to "wait" and require completion of one or more in-flight messages for a particular destination prior to sending additional messages to the destination.

In addition, in the example, send completed_ID 474 mirrors the value in completed_ID 426 and recv_completed_ID 476 holds a value indicating any message using the recv_completed_ID or older ID has completed. By maintaining send_completed_ID 474 and recv_completed_ID 476, for level 2 flow control 504, message flow controller 460 only needs to track messages using IDs with values greater than "send_completed_ID" for each sender. In particular, only tracking messages using IDs with values greater than "send_completed_ID" is necessary because source node 400 may retransmit any incomplete message and destination node 450 needs to identify the retransmission and identify whether the retransmission is a duplicate, to avoid delivery of the same message twice. In the example, the value of send_completed_ID 474 is not greater than the value of recv_completed_ID 476 because without destination node 450 completing a message first, destination node 450 will not send the acknowledgment to complete the same message at source node 400. As will be further described with reference to FIG. 8, receive object 488 includes a state 482 of each message being tracked indicating whether the message is being received or has been received.

For level 2 flow control 504, message flow controllers 410 and 460 issue message-level acknowledgments with message IDs, illustrated by an ack_completed_ID 494 and an ack_recv_completed_ID 496. Ack_completed_ID 494 copies completed_ID 426 so destination node 450 may update send_completed_ID 474 and ack_recv_completed_ID 496 copies recv_completed_ID 476 at destination node 450 so source node 400 may update completed_ID. The two ACK message IDs of a message-level acknowledgment are a small, optimized size and may be easily carried in any ack packet flowing from destination node 450 to source node 400 or may be sent in a dedicated packet from destination node 450 to source node 400. Although level 2 flow control 504 maintains reliability on a per destination basis, the size of the message IDs required for monitoring packet flow is minimized to only a few bytes, such that even as the number of destinations scale up memory consumption for level 2 flow control 504 optimizes memory usage.

Message flow controller 410 and message flow controller 460 may implement message-level flow control for level 2 flow control 504 using a flow control mechanism similar to the Sliding Window Protocol, but distinguishable from Sliding Window Protocol because the level 2 flow control 504 flow control mechanism allows messages to complete out-of-order, as will be further described with reference to FIG. 9, and allows for coalescing multiple message completion acknowledgments. In particular, message flow controller 410 assigns each message a unique consecutive sequence number as a message ID and message flow controller 460 uses the message IDs to place messages in order, discard duplicate messages, and identify missing messages. However, because a state of each message is maintained at a message level and level 2 flow control 504 tracks the state of messages within a range of message ID values and sends message-level acknowledgments between source node 400 and destination node 450 to acknowledge a range of completed message IDs, level 2 flow control 504 allows message flow controller 410 and message flow controller 460 to reliably optimize the tracking of messages of the same size or different sizes and whether completed in-order or out-of-order. By waiting for a range of message IDs for a same source ID to complete prior to sending a message-level acknowledgement with an updated ack_recv_completed_ID 496 to source node 400, message flow controller 460 effectively coalesces multiple acknowledgments for multiple message IDs into a single acknowledgment.

In one example, level 2 thresholds 462 specify the receiving thresholds for level 2 flow control 504 and may include multiple types of thresholds for controlling coalescing of message-level acknowledgments. In one example, level 2 thresholds 462 may specify a minimum difference between send_completed_ID 474 and recv_completed_ID 476 before a message-level acknowledgment may be returned. In another example, level 2 thresholds 462 may specify an in-flight per destination limit and trigger no coalescing or a lower coalescing threshold for message-level acknowledgments if the number of in-flight messages for a particular source reaches the in-flight message limit for a destination. It is important to note that, as previously described with reference to immediate ack flag 422, when the number of in-flight messages reaches level 1 limits 412, level 1 flow control 502 may set immediate ack flag 422 to request message flow controller 460 provide an immediate completion acknowledgment be returned to source node 400, in addition to the message level acknowledgments from level 2 flow control 504, to avoid any slowdown from message level acknowledgments.

Message flow controller 410 and message flow controller 460 implement level 3 flow control 506 by tracking the number of in-flight packets through a packet counter 428 per message object and limiting a message to producing a maximum number of in-flight packets set in level 3 limits 416. For managing level 3 flow control 506 message flow controller 410 and message flow controller 460 may implement multiple types of flow control mechanisms. For example, level 3 flow control 560 flow control mechanisms may include, but is not limited to, Sliding Window Protocol that enforces packets in the message to be received in-order, a mechanism similar to level 2 flow control allowing for out-of-order packets, or other flow control mechanisms that ensure reliable delivery of packets. Level 3 thresholds 464 may specify the receiving thresholds for level 3 flow control 506 and may include multiple types of thresholds for controlling triggering of packet-level acknowledgements and coalescing triggered packet-level acknowledgements. In one example, level 3 thresholds 464 may be set to trigger packet-level acknowledgements when the number of in-flight received packets reaches level 3 limits 416, such that packet-level acknowledgments are only triggered when the number of packets produced by a message reaches level 3 limits 416 on the number of in-flight packets for the message because packet-level acknowledgments are required before the message is allowed to produce additional in-flight packets. In addition, level 3 thresholds 464 may include a minimum number of packet-level acknowledgments to coalesce once packet-level acknowledgments are triggered.

In one example, at one or more of by process, by message, by destination or by packet, message flow controller 410 may trigger a timer when a message is sent or as individual packets are sent, illustrated as ack timer 418. When ack timer 418 pops message flow controller 410 scans the progress of relevant active messages, determines the progress of an active message, and may retransmit a message or individual packets of a message. The amount of time counted by ack timer 418 may be set according to process, message, node, or other factor. In addition, message flow controller 410 may monitor message flow statistics over time and set ack timer 418 to an amount which reflects the median waiting period for messages to complete, to balance between the potential for a message to need to be retransmitted with the resource usage for unnecessarily retransmitting messages too early.

Although FIG. 4 has been described with reference to three level of flow control, one of ordinary skill in the art will appreciate that additional levels of flow control may be implemented for additional or alternate types of data and that additional reliable message passing layers may include one or more additional levels of flow control.

With reference now to FIG. 7, a flow diagram illustrates one example of the states tracked for a message object when sending a message. In the example, when a new message request is received, as illustrated at reference numeral 702, so long as the in-flight message counter has not reached level 1 limits, the message flow controller initiates the data transfer by retrieving a new send object from the memory pool. The new send object allocated from the memory pool has a "free" state, as illustrated at reference numeral 710. Next, the message flow controller checks whether level 2 limits are met by detecting whether the number of in-flight message by destination meets the level 2 limits on the number of in-flight messages by destination.

In the example, when a send object is set to a "free" state, if the number of messages sent by destination does not exceed the level 2 limits, then the message flow controller allows the new message request and the send object is set to the "sending" state, as illustrated at reference numeral 718.

In the example, when the send object is set to the "free" state, if the number of messages set by destination meets the level 2 limits, then the message flow controller blocks the new message request and the send object is set to a "wait" state, as illustrated at reference numeral 714. Once the level 2 limits are no longer exceeded, the message flow controller unblocks the new message request and the send object is set to a "sending" state as illustrated at reference numeral 718.

When a send object is in the "sending state" illustrated at reference numeral 718, the message flow controller sends the data for the message, as further limited by level 3 flow control limiting the number of in-flight packets that each message can produce. At "sending state", as illustrated at reference numeral 718, the message flow controller may both send data and receive packet-level acknowledgements if the message is large and level 3 flow control limits are applied. Once the message flow controller detects all the packets for the new message request are sent out, the message flow controller sets the send object to a "sent" state as illustrated at reference numeral 722. While the send object is set to a "sent" state, the message flow controller monitors for message-level acknowledgements and any packet-level acknowledgments from the destination node. Once the message flow controller detects all the acknowledgements for all the data packets sent for a new message request are received, the message flow controller sets the state of the send object to "done" as illustrated at reference numeral 724, discards the message history, sets the state of the send object to "free" as illustrated at reference numeral 710, and returns the buffer for the send object to the memory pool for further reuse.

Referring now to FIG. 8, a flow diagram illustrates one example of the states tracked for a message object when receiving a message. In the example, when a new incoming message is received, as illustrated at reference numeral 802, the message flow controller requests a new receive object from the memory pool. The new receive object allocated from the memory pool initially has a "free" state, as illustrated at reference numeral 810, and when the buffer is received from the memory pool the state of the receive object is set to a "receiving" state, as illustrated at reference numeral 812. The message flow controller detects received data packets and triggers message-level and packet-level acknowledgments as level 2 limits and level 3 receiving thresholds are reached. Once all the data packets of a message are received, the message flow controller sets the receive object to a "received" state as illustrated at reference numeral 814, discards the message history, sets the state of the receive object to "free" as illustrated at reference numeral 810, and returns the buffer for the receive object to the memory pool for further reuse.

Figure 9:
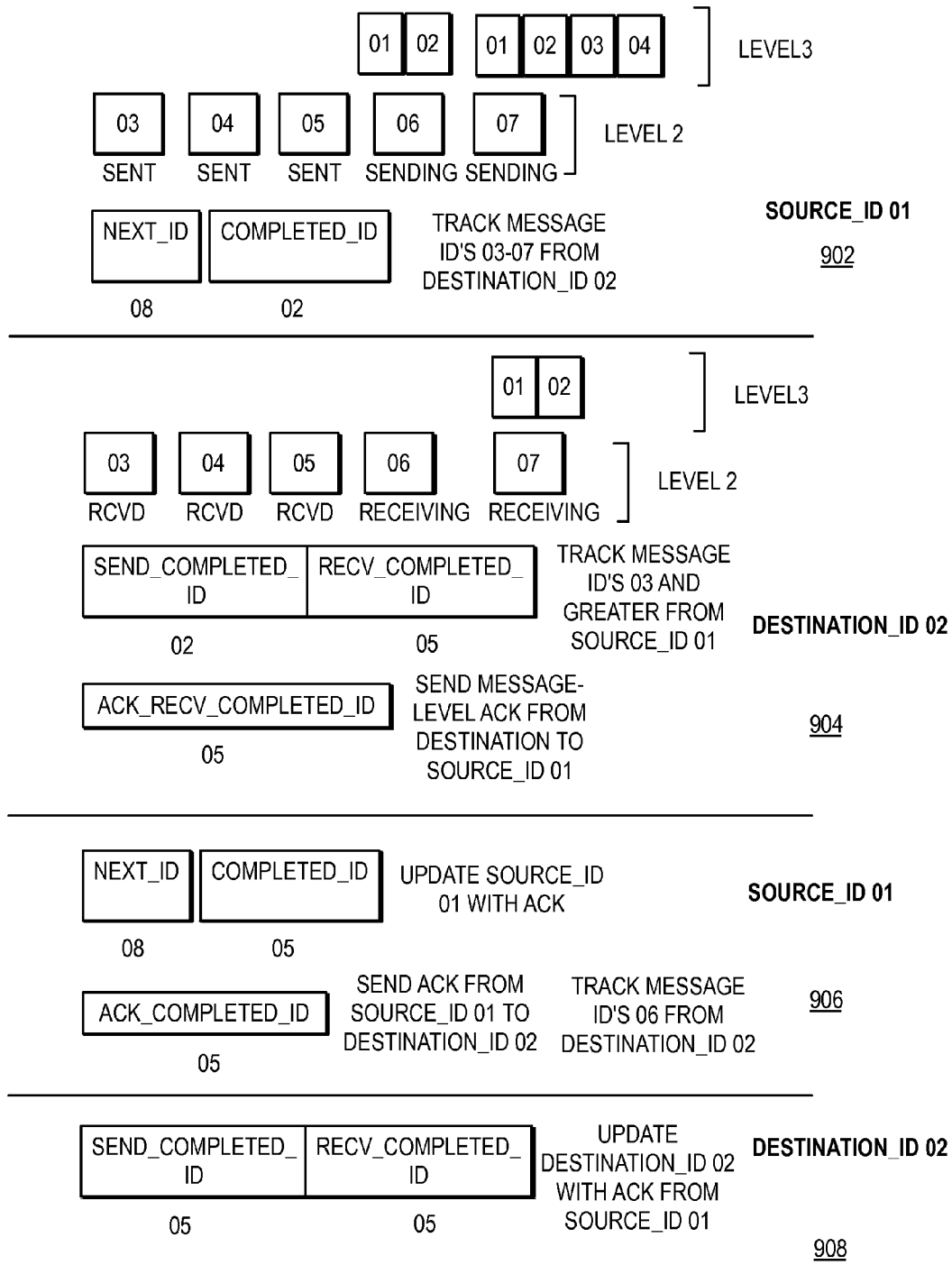
FIG. 9 is a block diagram depicting one example of multiple level message flow control in a reliable message passing layer.

With reference now to FIG. 9, a block diagram depicts one example of multiple level message flow control in a reliable message passing layer. In the example, at a first time 902, at the source node with an ID of "source_ID 01", level 2 flow control IDs are set for a destination node with an ID of "destination_ID 02" to a "next_ID" at "08" and a "completed_ID" at "02". For level 2 flow control, the message flow controller will track in-flight packets for the particular destination with message IDs from "completed_ID+1" of "03" to "next_ID−1" of "07". As illustrated, a message object for each of the messages, numbered "03" through "07" indicates a state of the message as "sent" or "sending". Level 3 includes packet IDs tracked in send objects for message IDs "06" and "07", where packets "01" and "02" are sent for message ID "06" and packets "01", "02", "03", and "04" are sent for message ID "07".

At a next time 904, at the destination node "destination_ID 02", level 2 flow control IDs for "source_ID 01" are set to a "send_completed_ID" of "02" and a "recv_completed_ID" of "05". For level 2 flow control, the message flow controller will track in-flight packets with message IDs greater than "send_completed_ID" of "03" and greater for "source_ID 01". As illustrated, a message object for each of the messages numbered "03" through "07" indicates a state of the message as "rcvd" (for received) and "receiving". Level 3 includes packet IDs tracked in receive objects for message IDs "06"

and "07", where none of the sent packets for message ID "06" are yet received and where only packets "01" and "02" are yet received for message ID "07". Although not depicted, if an immediate ack flag were set for "source_ID 01" at "destination_ID 02", the message flow controller may return acknowledgments for each of the messages numbered "03", "04", and "05" upon completion, separate from a message-level acknowledgment.

In the example, at time 904, the level 2 threshold may be triggered when three or more message are received for a particular source, regardless of the order in which the messages were received, such that in the example where message IDs "03", "04", and "05" are set to "rcvd", the received acknowledgments for message IDs "03", "04", and "05" are triggered and effectively coalesced into a single acknowledgment. In particular, the destination node message flow controller sends a message-level acknowledgment packet to the source node with "ack_recv_completed"ID" set to "05" to report the last received message ID to the source node. In addition, although not depicted, the message flow controller for the destination node may set the receive objects for message IDs "03", "04", and "05" to "free" and return the buffers used by the receive objects to the memory pool.

At a next time 906, at the source node, level 2 flow control updates "competed_ID" for "source_ID 01" with the value of "ack_received_completed_ID" in the acknowledgment packet. In the example, by setting "completed_ID" to "ack_received_completed_ID", the source node receives a single acknowledgment for the messages with IDs "03", "04", and "05" and the message flow controller may release the buffers for the send objects for these messages back to the memory pool. In addition, "source_ID 01" sends an acknowledgement packet to "destination_ID 02" with "ack_completed_ID" set to "completed_ID".

At a next time 908, at the destination node, level 2 flow control updates "send_completed_ID" at "destination_ID 02" with the value in the acknowledgment "ack_completed_ID". After updating "send_completed_ID", the source node and destination node have both completed the message passing process for messages through message ID "05".

Figure 10:
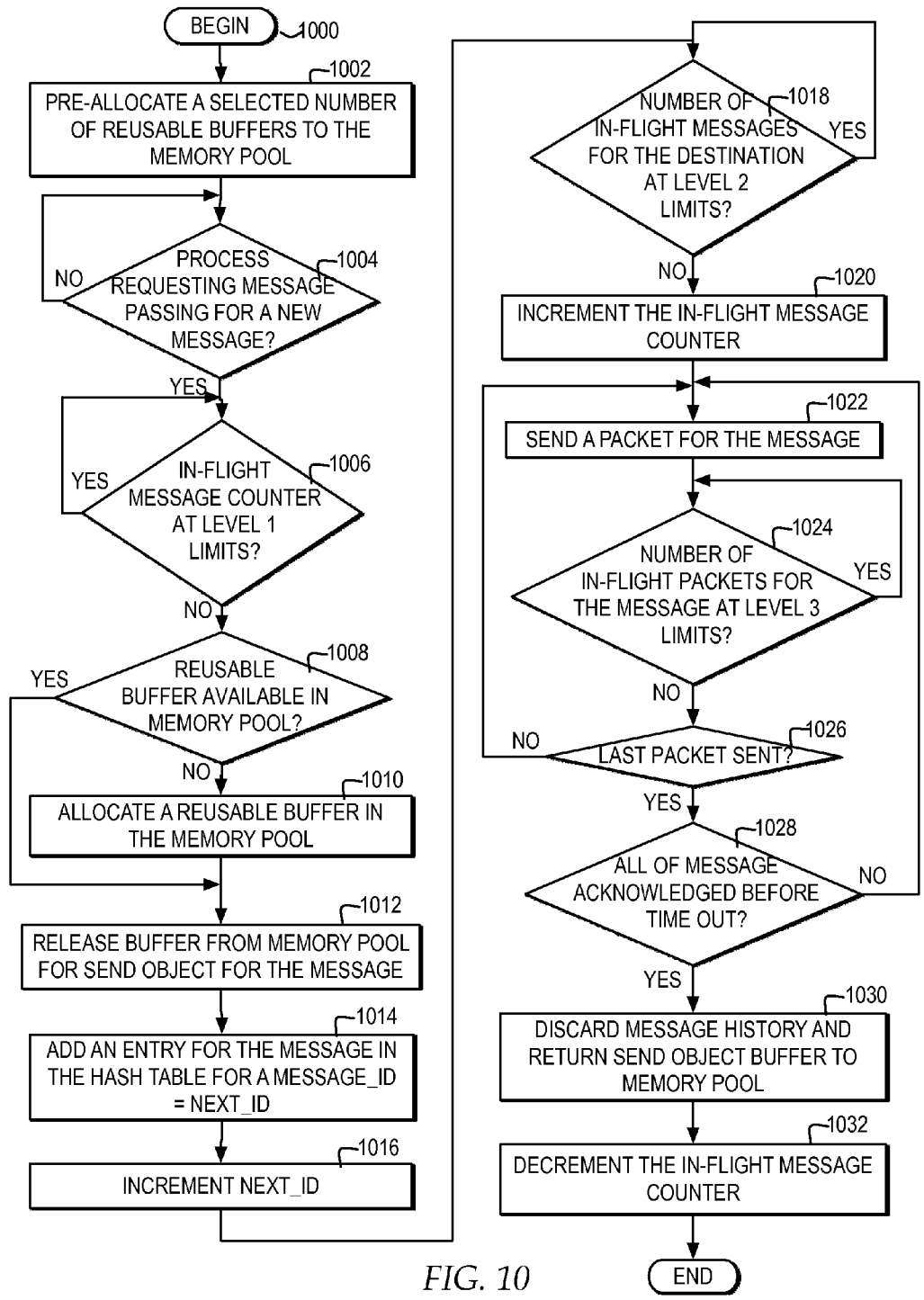
FIG. 10 is a high level logic flowchart illustrating a process and program for a message flow controller at a source node managing message passing.

Referring now to FIG. 10, a high level logic flowchart depicts a process and program for a message flow controller at a source node managing message passing. As illustrated, the process starts at block 1000 and thereafter proceeds to block 1002. Block 1002 depicts pre-allocating a selected number of reusable buffers to the memory pool. Next, block 1004 illustrates a determination whether a process is requesting message passing for a new message. If a process is requesting message passing for a new message, then the process passes to block 1006. Block 1006 depicts a determination whether the in-flight message counter is at level 1 limits. If the in-flight message counter is at level 1 limits, then the number of in-flight messages for a process is limited and the process waits at block 1006. If the in-flight message counter is not at level 1 limits, then the process passes to block 1008.

Block 1008 depicts a determination whether there is a reusable buffer available in the memory pool. If there is a reusable buffer available in the memory pool, then the process passes to block 1012. If there is not a reusable buffer available in the memory pool, then the process passes to block 1010. Block 1010 illustrates allocating a reusable buffer in the memory pool, and the process passes to block 1012.

Block 1012 illustrates releasing an available buffer from the memory pool for allocation to a send object for the message. Next, block 1014 depicts adding an entry for the message in the hash table for a message_ID set to the next_ID value maintained by the source node. Thereafter, block 1016 illustrates incrementing the next_ID value, and the process passes to block 1018.

Block 1018 depicts a determination whether the number of in-flight messages for the destination is at level 2 limits. If the number of in-flight messages for the destination for the message has reached level 2 limits, then the number of in-flight messages for the destination is limited and the process waits at block 1018. If the number of in-flight messages for the destination is not at level 2 limits, then the process passes to block 1020.

Block 1020 illustrates incrementing the in-flight message counter. Next, block 1022 illustrates sending a packet for the message to the destination. Thereafter, block 1024 depicts a determination whether the number of in-flight packets for the message is at level 3 limits. If the number of in-flight packets for the message is at level 3 limits, then the number of in-flight packets is limited and the process waits at block 1024. If the number of in-flight packets for the message is not at level 3 limits, then the process passes to block 1026.

Figure 13:
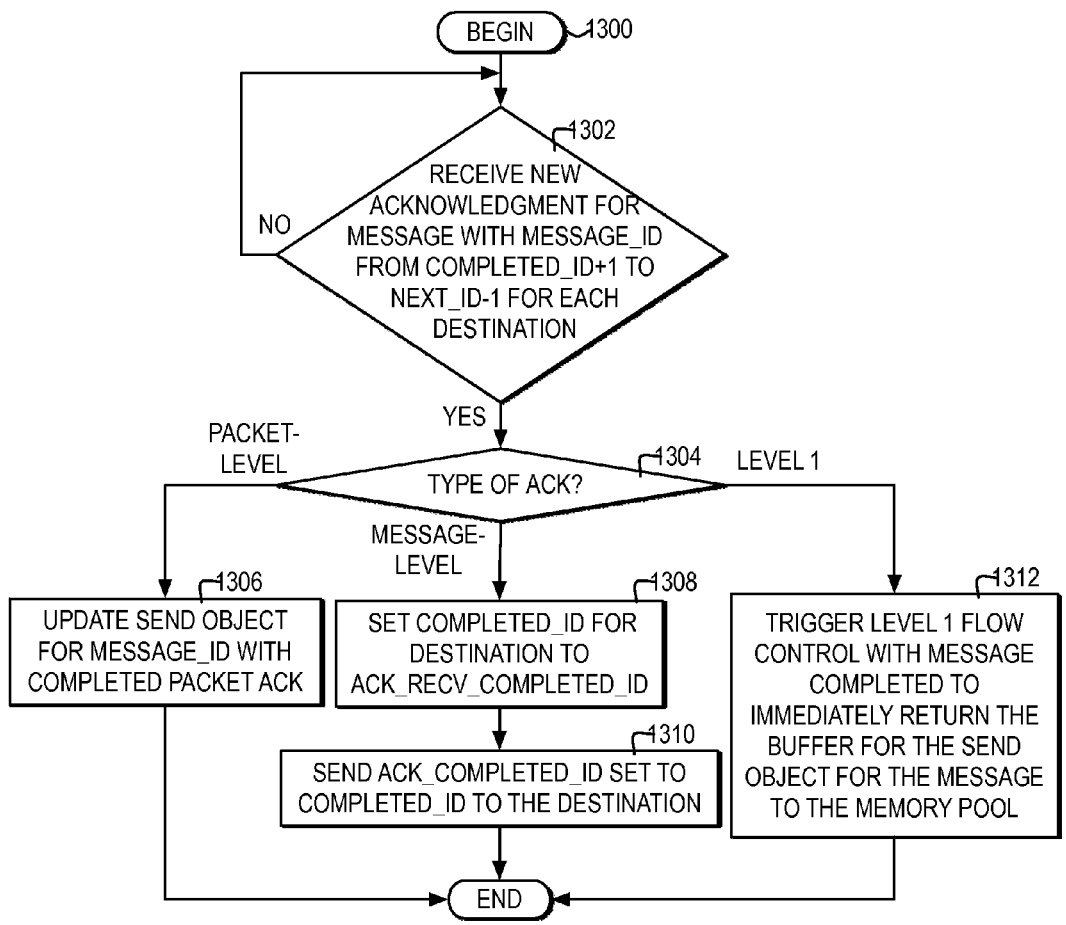
FIG. 13 is a high level logic flowchart illustrating a process and program for a message flow controller at a source node managing acknowledgments.

Block 1026 depicts a determination whether the packet sent is the last packet. If the last packet is not sent, then the process returns to block 1022. If last packet is sent, then the process passes to block 1028. Block 1028 illustrates a determination whether all of the message is acknowledged before a timer times out and expires. In one example, FIG. 13 illustrates a process for monitoring for and processing level 1, message-level and packet-level acknowledgements. If not all the message is acknowledged before a timer times out, then the process triggers resending the packet and returns to block 1022. If a message is acknowledged before the timer times out, then the process passes to block 1030. Block 1030 depicts discarding the message history for the send object for the message and returning the send object buffer to the memory pool. Next, block 1032 illustrates decrementing the in-flight counter, and the process ends.

Figure 11:
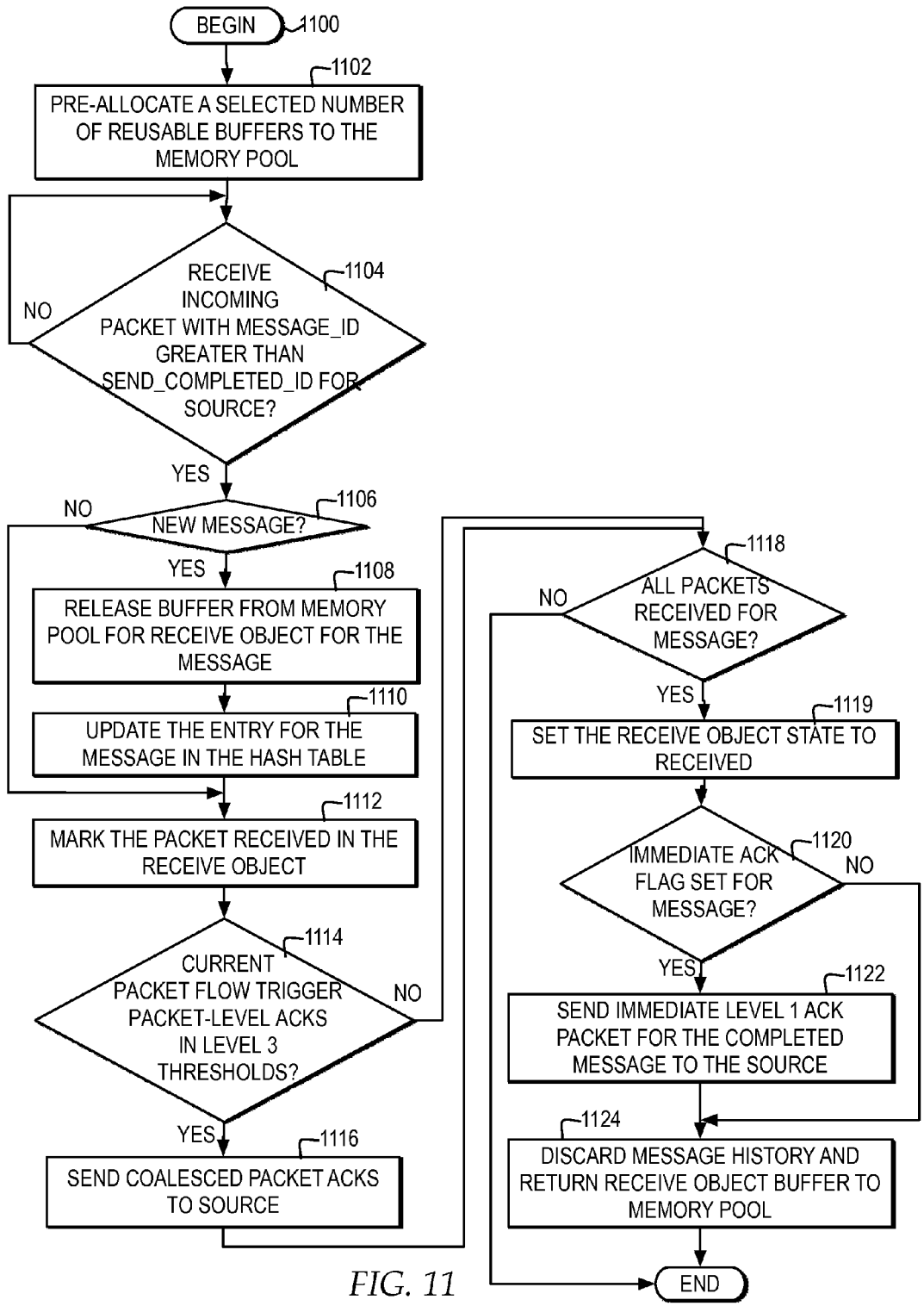
FIG. 11 is a high level flowchart depicting a process and program for a message flow controller at a destination node managing message passing.

With reference now to FIG. 11, a high level flowchart depicts a process and program for a message flow controller at a destination node managing message passing. In the example, the process starts at block 1100 and thereafter proceeds to block 1102. Block 1102 depicts pre-allocating a selected number of reusable buffers to the memory pool. Next, block 1104 illustrates a determination whether an incoming packet is received with a message_ID greater than the send_completed_ID for the particular source from which the packet is sent. If the packet does not have a message_ID greater than the send_completed_ID then the process waits. If the packet does have a message_ID greater than the send_completed_ID then the process passes to block 1106.

Block 1106 depicts a determination whether the message_ID of the packet is for a new message. If the message_ID of the packet is not for a new message, then the process passes to block 1112. If the message_ID of the packet is for a new message, then the process passes to block 1108. Block 1108 illustrates releasing a buffer from the memory pool for allocating a receive object for the message. Next, block 1110 depicts updating the entry for the message in the hash table, and the process passes to block 1112.

Block 1112 illustrates marking the packet received in the receive object. Next, block 1114 depicts a determination whether the current packet flow triggers packet-level acknowledgments in the level 3 thresholds. If the current packet flow does not trigger packet-level acknowledgments, then the process passes to block 1118. If the current packet flow triggers packet-level acknowledgments, then the process passes to block 1116. Block 1116 depicts sending coalesced packet acknowledgments to the source, and the process passes to block 1118.

Block 1118 depicts a determination whether all the packets are received for a message. If all the packets are not received for a message, then the process ends. If all the packets are received for a message, then the process passes to block 1119. Block 1119 depicts setting the receive object state to received, which may trigger sending a message-level acknowledgement as described in FIG. 12, and the process passes to block 1120. Block 1120 depicts a determination whether the immediate ack flag is set for a message. If the immediate ack flag is not set for a message, then the process passes to block 1124. If the immediate ack flag is set for a message, then the process passes to block 1122. Block 1122 depicts sending an immediate level 1 ack packet for the completed message to the source, and the process passes to block 1124. Block 1124 depicts discarding the message history for the message and returning the receive object buffer for the message to the memory pool, and the process ends.

Figure 12:
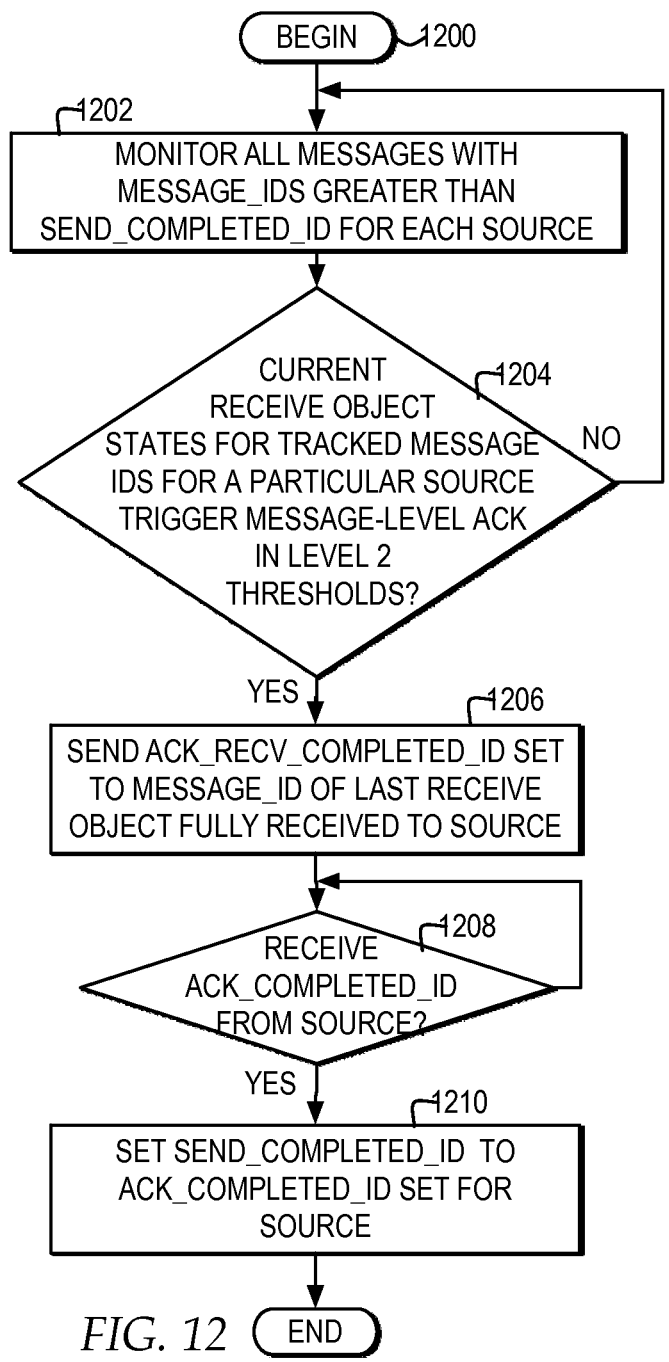
FIG. 12 is a high level flowchart depicting a process and program for a message flow controller at a destination node managing acknowledgments.

With reference now to FIG. 12, a high level flowchart depicts a process and program for a message flow controller at a destination node managing acknowledgments. In the example, the process starts at block 1200 and thereafter proceeds to block 1202. Block 1202 depicts monitoring all messages with message IDs greater than the value of send_completed_ID for each source. Next, block 1204 illustrates a determination whether the current receive object states for tracked message IDs for a particular source trigger message-level acknowledgments in level 2 thresholds. If current receive object states do not trigger message-level acknowledgments in level 2 thresholds, then the process waits. If current receive object states do trigger message-level acknowledgements in level 2 thresholds, then the process passes to block 1206. Block 1206 depicts sending a packet to the source with ack_recv_completed_ID set to the message_ID of the receive object with a state showing the message is fully received. Next, block 1208 illustrates a determination whether a packet with ack_completed_ID is received from the source. Once a packet with ack_completed_ID is received from the source, the process passes to block 1210. Block 1210 depicts setting send_completed_ID to ack_completed_ID for the source, and the process ends.

Referring now to FIG. 13, a high level logic flowchart illustrates a process and program for a message flow controller at a source node managing acknowledgments. In the example, the process starts at block 1300 and thereafter proceeds to block 1302. Block 1302 depicts a determination whether a new acknowledgment is received for a message with a message_ID value within the range of completed_ID+1 to next_ID−1 for a destination. If a new acknowledgment within the range is received, then the process passes to block 1304. Block 1304 depicts a determination of the type of acknowledgement.

At block 1304, if the acknowledgment is a packet-level acknowledgement, then the process passes to block 1306. Block 1306 depicts updating the send object for the identified message_ID with the completed packet acknowledgment, and the process ends.

At block 1304, if the acknowledgment is a message-level acknowledgment, then the process passes to block 1308. Block 1308 depicts a setting the completed_ID for the identified destination to ack_recv_completed_ID in the acknowledgment. Next, block 1310 illustrates sending a packet to the destination with ack_completed_ID set to completed_ID, and the process ends.

At block 1304, if the acknowledgement is a level 1 ack, then the process passes to block 1312. Block 1312 depicts triggering level 1 flow control that the message is completed for immediate return of the buffer for the send object for the completed message to the memory pool, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for flow control for message passing in a reliable message passing layer, comprising:

responsive to receiving a request to pass a new message in a reliable message passing layer from a process, limiting, using a processor, the process from passing the new message from a source node to at least one destination node while a total number of in-flight messages for the process reaches a first level limit;

responsive to the total number of in-flight messages for the process not reaching the first level limit, limiting, using the processor, the new message from passing from the source node to a particular destination node from among a plurality of destination nodes while a total number of in-flight messages to the particular destination node reaches a second level limit;

responsive to the total number of in-flight messages to the particular destination node not reaching the second level limit, only sending a new packet from among at least one packet for the new message from the source node to the particular destination node while a total number of in-flight packets for the new message is less than a third level limit;

responsive to sending the at least one packet from the source node to the particular destination node, tracking, using the processor, whether an acknowledgment is received from the destination node of complete receipt of the new message;

responsive to the total number of in-flight messages for the process not reaching the first level limit, determining whether a pre-allocated buffer from among a plurality of pre-allocated buffers is available from a memory pool for the message;

responsive to detecting the memory pool is empty, allocating a new buffer to the memory pool;

responsive to detecting the memory pool with at least one available pre-allocated buffer, allocating a particular buffer from the memory pool for a send object for the new message;

tracking by the send object a separate packet flow control window for each at least one packet; and tracking, for the send object, a state of the new message from among a wait state when waiting while the number of in-flight messages to the particular destination node reaches the second level limit, a sending state when sending the at least one packet, a sent state when the at least one packet is full sent and a done state when the acknowledgement is received from the destination node of complete receipt of the new message.

2. The method according to claim 1, further comprising:

responsive to receiving the new packet at the destination node, detecting whether the new packet has a message identifier for the new message for a message already allocated at the destination node;

responsive to the new packet having a message identifier for the new message not already allocated at the destination node, allocating a destination buffer from a destination memory pool for a receive object for the message identifier of the new message;

marking the new packet received in the receive object for the new message;

monitoring for additional packets from among the at least one packet for the new message and marking the additional packets received in the receive object for the new message;

responsive to a current number of in-flight packets for the new message meeting a level three threshold, sending a packet level acknowledgment for the new message specifying receipt of the in-flight packets to the source node;

responsive to receiving a last packet of the at least one packet for the new message at the particular destination, setting the state of the receive object to received; and responsive to detecting a number of a plurality of receive objects set to a received state meeting a second level threshold minimum number of receive objects set to the received state, sending a message level acknowledgement comprising an acknowledgment received completed identifier set to a value of a message identifier associated with a last sequential receive object set to the received state, such that acknowledgements for the plurality of receive objects are coalesced into the message level acknowledgment.

3. The method according to claim 1, further comprising:

responsive to the total number of in-flight messages for the process reaching the first level limit, sending an immediate acknowledgment flag from the source node to the particular destination node; and responsive to the destination node receiving the immediate acknowledgment flag from the source node, automatically immediately sending the acknowledgement to the source node for the new message upon detecting complete receipt of the new message at the particular destination node.

4. The method according to claim 1, further comprising:

sending the at least one packet from the source node to the particular destination node across an unreliable interconnection network.

5. The method according to claim 1, wherein the reliable message passing layer is a low-level application program interface (LAPI).

6. The method according to claim 1, wherein responsive to sending the at least one packet from the source node to the particular destination node, tracking whether an acknowledgment is received from the destination node of complete receipt of the new message further comprises:

maintaining a next identifier value for separate destination from among said plurality of destinations;

responsive to receiving the new message for the particular destination, assigning the message identifier for the new message from a particular next identifier value set for the particular destination and incrementing the value of the particular next identifier value;

detecting whether a particular acknowledgement packet received from the particular destination comprises an acknowledgment received completed identifier falling within a range of values from a completed identifier value plus one through the particular next identifier value less one; and responsive to detecting the particular acknowledgement packet received from the particular destination comprises the acknowledgement received completed identifier falling within the range, setting the completed identifier value to the acknowledgment received completed identifier value and sending an acknowledgement to the particular destination node with an acknowledgement completed identifier set to the completed identifier value.

7. A system for flow control for message passing in a reliable message passing layer, comprising:

a message flow controller implemented in a reliable message passing layer distributed within a computing environment comprising a plurality of computing nodes each comprising at least one processor coupled to at least one memory and each interconnected via an interconnection network, wherein the message flow controller is operative on at least one of the at least one processor;

the message flow controller, responsive to receiving a request to pass a new message in the reliable message passing layer from a process, operative to limit the process from passing the new message from a source node to at least one destination node while a total number of in-flight messages for the process reaches a first level limit;

the message flow controller, responsive to the total number of in-flight messages for the process not reaching the first level limit, operative to limit the new message from passing from the source node to a particular destination node from among a plurality of destination nodes while a total number of in-flight messages to the particular destination node reaches a second level limit;

the message flow controller, responsive to the total number of in-flight messages to the particular destination node not reaching the second level limit, operative to only send a new packet from among at least one packet for the new message from the source node to the particular destination node while a total number of in-flight packets for the new message is less than a third level limit;

the message flow controller, responsive to sending the at least one packet from the source node to the particular destination node, operative to track whether an acknowledgment is received from the destination node of complete receipt of the new message;

the message flow controller, responsive to the total number of in-flight messages for the process not reaching the first level limit, operative to determine whether a pre-allocated buffer from among a plurality of pre-allocated buffers is available from a memory pool for the message;

the message flow controller, responsive to detecting the memory pool is empty, operative to allocate a new buffer to the memory pool;

the message flow controller, responsive to detecting the memory pool with at least one available pre-allocated buffer, operative to allocate a particular buffer from the memory pool for a send object for the new message;

the message flow controller operative to track by the send object a separate packet flow control window for each at least one packet; and the message flow controller operative to track for the send object, a state of the new message from among a wait state when waiting while the number of in-flight messages to the particular destination node reaches the second level limit, a sending state when sending the at least one packet, a sent state when the at least one packet is fully sent, and a done state when the acknowledgement is received from the destination node of complete receipt of the new message.

8. The system according to claim 7, further comprising:

the message flow controller, responsive to receiving the new packet at the destination node, operative to detect whether the new packet has a message identifier for the new message for a message already allocated at the destination node;

the message flow controller, responsive to the new packet having a message identifier for the new message not already allocated at the destination node, operative to allocate a destination buffer from a destination memory pool for a receive object for the message identifier of the new message;

the message flow controller operative to mark the new packet received in the receive object for the new message;

the message flow controller operative to monitor for additional packets from among the at least one packet for the new message and marking the additional packets received in the receive object for the new message;

the message flow controller, responsive to a current number of in-flight packets for the new message meeting a level three threshold, operative to send a packet level acknowledgment for the new message specifying receipt of the in-flight packets to the source node;

the message flow controller, responsive to receiving a last packet of the at least one packet for the new message at the particular destination, operative to set the state of the receive object to received; and the message flow controller, responsive to detecting a number of a plurality of receive objects set to a received state meeting a second level threshold minimum number of receive objects set to the received state, operative to send a message level acknowledgement comprising an acknowledgment received completed identifier set to a value of a message identifier associated with a last sequential receive object set to the received state, such that acknowledgements for the plurality of receive objects are coalesced into the message level acknowledgment.

9. The system according to claim 7, further comprising:

the message flow controller, responsive to the total number of in-flight messages for the process reaching the first level limit, operative to send an immediate acknowledgment flag from the source node to the particular destination node; and the message flow controller, responsive to the destination node receiving the immediate acknowledgment flag from the source node, operative to automatically immediately send the acknowledgement to the source node for the new message upon detecting complete receipt of the new message at the particular destination node.

10. The system according to claim 7, further comprising:

the message flow controller operative to send the at least one packet from the source node to the particular destination node across an unreliable interconnection network.

11. The system according to claim 7, wherein the reliable message passing layer is a low-level application program interface (LAPI).

12. The system according to claim 7, wherein the message flow controller, responsive to sending the at least one packet from the source node to the particular destination node, operative to track whether an acknowledgment is received from the destination node of complete receipt of the new message further comprises:

the message flow controller operative to maintain a next identifier value for separate destination from among said plurality of destinations;

the message flow controller, responsive to receiving the new message for the particular destination, operative to assign the message identifier for the new message from a particular next identifier value set for the particular destination and incrementing the value of the particular next identifier value;

the message flow controller operative to detect whether a particular acknowledgement packet received from the particular destination comprises an acknowledgment received completed identifier falling within a range of values from a completed identifier value plus one through the particular next identifier value less one; and the message flow controller, responsive to detecting the particular acknowledgement packet received from the particular destination comprises the acknowledgement received completed identifier falling within the range, operative to set the completed identifier value to the acknowledgment received completed identifier value and sending an acknowledgement to the particular destination node with an acknowledgement completed identifier set to the completed identifier value.

13. A computer program product for flow control for message passing in a reliable message passing layer, the computer program product comprising:
one or more computer-readable, tangible storage devices;
program instructions, stored on at least one of the one or more devices, responsive to receiving a request to pass a new message in a reliable message passing layer from a process, to limit the process from passing the new message from a source node to at least one destination node while a total number of in-flight messages for the process reaches a first level limit;
program instructions, stored on at least one of the one or more devices, responsive to the total number of in-flight messages for the process not reaching the first level limit, to limit the new message from passing from the source node to a particular destination node from among a plurality of destination nodes while a total number of in-flight messages to the particular destination node reaches a second level limit;
program instructions, stored on at least one of the one or more devices, responsive to the total number of in-flight messages to the particular destination node not reaching the second level limit, to only send a new packet from among at least one packet for the new message from the source node to the particular destination node while a total number of in-flight packets for the new message is less than a third level limit;
program instructions, stored on at least one of the one or more devices, responsive to sending the at least one packet from the source node to the particular destination node, to track whether an acknowledgment is received from the destination node of complete receipt of the new message;
program instructions, stored on at least one of the one or more devices, responsive to the total number of in-flight messages for the process not reaching the first level limit, to determine whether a pre-allocated buffer from among a plurality of pre-allocated buffers is available from a memory pool for the message;
program instructions, stored on at least one of the one or more devices, responsive to detecting the memory pool is empty, to allocate a new buffer to the memory pool;
program instructions, stored on at least one of the one or more devices, responsive to detecting the memory pool with at least one available pre-allocated buffer, to allocate a particular buffer from the memory pool for a send object for the new message;
program instructions, stored on at least one of the one or more devices, to track by the send object a separate packet flow control window for each at least one packet; and
program instructions, stored on at least one of the one or more devices, to track, for the send object, a state of the new message from among a wait state when waiting while the number of in-flight messages to the particular destination node reaches the second level limit, a sending state when sending the at least one packet, a sent state when the at least one packet is fully sent, and a done state when the acknowledgement is received from the destination node of complete receipt of the new message.

14. The computer executable program product according to claim 13, further comprising instructions, stored on at least one of the one or more devices, to:
program instructions, stored on at least one of the one or more devices, responsive to receiving the new packet at the destination node, to detect whether the new packet has a message identifier for the new message for a message already allocated at the destination node;
program instructions, stored on at least one of the one or more devices, responsive to the new packet having a message identifier for the new message not already allocated at the destination node, to allocate a destination buffer from a destination memory pool for a receive object for the message identifier of the new message;
program instructions, stored on at least one of the one or more devices, to mark the new packet received in the receive object for the new message;
program instructions, stored on at least one of the one or more devices, to monitor for additional packets from among the at least one packet for the new message and marking the additional packets received in the receive object for the new message;
program instructions, stored on at least one of the one or more devices, responsive to a current number of in-flight packets for the new message meeting a level three threshold, to send a packet level acknowledgment for the new message specifying receipt of the in-flight packets to the source node;
program instructions, stored on at least one of the one or more devices, responsive to receiving a last packet of the at least one packet for the new message at the particular destination, to set the state of the receive object to received; and
program instructions, stored on at least one of the one or more devices, responsive to detecting a number of a plurality of receive objects set to a received state meeting a second level threshold minimum number of receive objects set to the received state, to send a message level acknowledgement comprising an acknowledgment received completed identifier set to a value of a message identifier associated with a last sequential receive object set to the received state, such that acknowledgements for the plurality of receive objects are coalesced into the message level acknowledgment.

15. The computer program product according to claim 13, further comprising instructions, stored on at least one of the one or more devices, to:
program instructions, stored on at least one of the one or more devices, responsive to the total number of in-flight messages for the process reaching the first level limit, to send an immediate acknowledgment flag from the source node to the particular destination node; and
program instructions, stored on at least one of the one or more devices, responsive to the destination node receiving the immediate acknowledgment flag from the source node, to automatically immediately send the acknowledgement to the source node for the new message upon detecting complete receipt of the new message at the particular destination node.

16. The computer program product according to claim 13, further comprising instructions, stored on at least one of the one or more devices, to:
program instructions, stored on at least one of the one or more devices, to send the at least one packet from the source node to the particular destination node across an unreliable interconnection network.

17. The computer executable program product according to claim 13, further comprising instructions, stored on at least one of the one or more devices, to:

program instructions, stored on at least one of the one or more devices, to maintain a next identifier value for separate destination from among said plurality of destinations;

program instructions, stored on at least one of the one or more devices, responsive to receiving the new message for the particular destination, to assign the message identifier for the new message from a particular next identifier value set for the particular destination and incrementing the value of the particular next identifier value;

program instructions, stored on at least one of the one or more devices, to detect whether a particular acknowledgement packet received from the particular destination comprises an acknowledgment received completed identifier falling within a range of values from a completed identifier value plus one through the particular next identifier value less one; and program instructions, stored on at least one of the one or more devices, responsive to detecting the particular acknowledgement packet received from the particular destination comprises the acknowledgement received completed identifier falling within the range, to set the completed identifier value to the acknowledgment received completed identifier value and sending an acknowledgement to the particular destination node with an acknowledgement completed identifier set to the completed identifier value.

* * * * *